United States Patent [19]

Lott

[11] Patent Number: 4,494,384
[45] Date of Patent: Jan. 22, 1985

[54] APPARATUS FOR ENHANCING THE PERFORMANCE OF A VEHICLE AIR CONDITIONING SYSTEM

[75] Inventor: John Lott, Auburndale, Fla.

[73] Assignee: Judy A. Lott, Auburndale, Fla.

[21] Appl. No.: 553,490

[22] Filed: Nov. 21, 1983

[51] Int. Cl.³ .............................................. F25B 47/00
[52] U.S. Cl. .................................... 62/279; 62/305; 62/506; 123/41.3; 180/68.2; 417/118
[58] Field of Search ................ 62/279, 181, 305, 506; 417/118, 379; 239/373; 180/68.1, 68.2; 60/668; 123/41.3

[56] References Cited

U.S. PATENT DOCUMENTS

| 2,735,368 | 2/1956 | Antonazzi | 417/379 X |
| 2,820,351 | 1/1958 | Dolza et al. | 62/279 X |
| 2,932,177 | 4/1960 | Brennan | 62/279 X |
| 3,260,463 | 7/1966 | Giovansanti et al. | 239/373 X |
| 3,306,067 | 2/1967 | Anglin | 62/279 X |
| 3,355,908 | 12/1967 | Anglin | 62/279 X |
| 3,812,687 | 5/1974 | Stolz | 62/279 X |
| 3,913,345 | 10/1975 | Goettl | 62/181 X |
| 3,926,000 | 12/1975 | Scofield | 62/305 X |

Primary Examiner—William E. Tapolcai
Attorney, Agent, or Firm—George B. Oujevolk

[57] ABSTRACT

An elongated cylinder is placed towards the front end of a vehicle such as an automobile at a lower level than the air conditioning unit evaporator drain and connected to the evaporator drain by a hose. This cylinder forms a reservoir, spray units are located at the ends or top of the reservoir and, condensate from the air conditioning unit in the reservoir is forced out of the reservoir into the spray units by internally applied air pressure. Outside air created by the vehicle forward movement is captured by one or more flanged pipes and provides the source for the internally applied air pressure. Condensate spray from the cylinder directed by the vehicle radiator fan flows onto the vehicle condenser core so as to assist in removing heat from the circulating freon sending a much cooler freon back into the vehicle.

1 Claim, 5 Drawing Figures

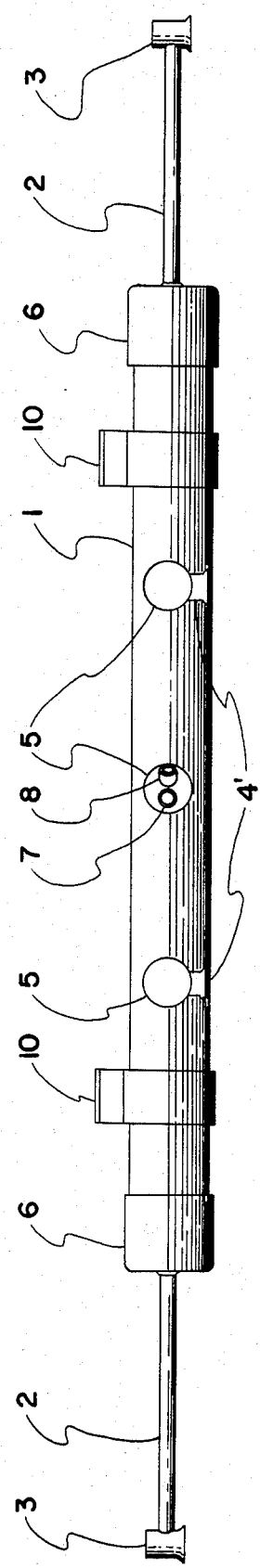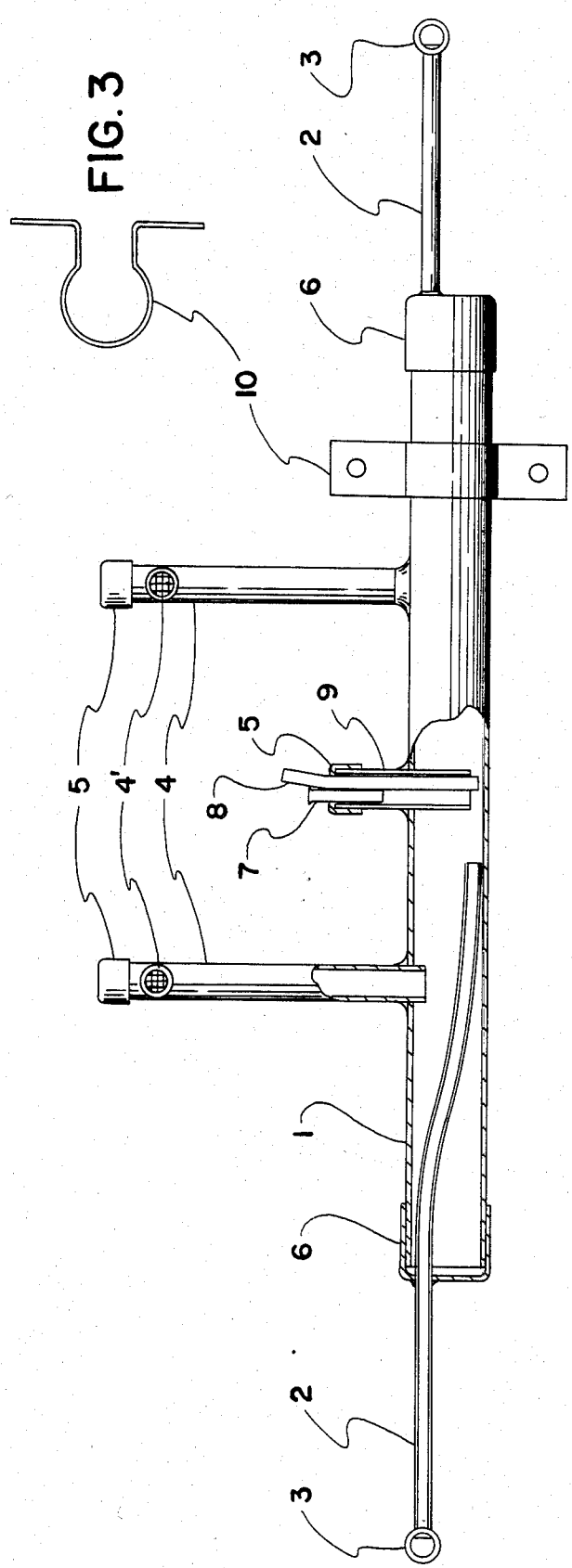

APPARATUS FOR ENHANCING THE PERFORMANCE OF A VEHICLE AIR CONDITIONING SYSTEM

BACKGROUND OF THE INVENTION

The present invention relates to a motor vehicle air conditioning system, and more particularly to the use of water provided by the vehicle's air conditioning evaporator drain to cool the system freon so as to send much cooler freon back into the vehicle.

SUMMARY OF THE INVENTION

Generally speaking, the present inventive concept which has no moving parts makes use of the air flow created by the forward movement of the vehicle and the air flow created by the vehicle's radiator cooling fan for its power source.

Water which is normally discarded from the vehicle's air conditioning unit through the evaporator drain is the water source. A hose is connected to the vehicle's evaporator drain and gravity feeds the water condensate to a reservoir installed at the front of the vehicle at a lower elevation than the evaporator drain. One or more spray units are located on either end or on top of the reservoir. Condensate from the evaporator drain in the reservoir is forced out of the reservoir into the spray units by internal air pressure.

The outside air flow is forced into the reservoir by one or more flared intake pipes. These pipes always force air into the top of the reservoir but are designed to capture air flow at different locations, depending on the vehicle's design. These intake pipes are flared to capture the maximum air flow and exert a greater pressure above the condensate in the reservoir than gravity on the condensate. This internal pressure then forces the condensate to exit via the spray units.

Once condensate spray is forced out of the reservoir, air flow from the forward movement and air flow created by the vehicle radiator cooling fan directs the condensate spray into the vehicle's air conditioning condenser core. The condensate then assists the condenser core in removing heat from the circulating freon, sending a much cooler freon back into the vehicle air conditioning compressor. A small amount of condensate spray passes through the condensor core and aids the vehicle radiator in removing heat from the hot water circulating through the radiator.

The invention as well as other objects and advantages thereof will become more apparent from the following detailed description when taken in conjunction with the accompanying drawings, in which:

FIG. 1 is a perspective side view of the arrangement contemplated herein with a partly broken away section to show interior construction;

FIG. 2 shows a top view of the arrangement shown in FIG. 1 with mounting brackets;

FIG. 3 is a side view of a mounting bracket;

DETAILED DESCRIPTION

Figure 5:
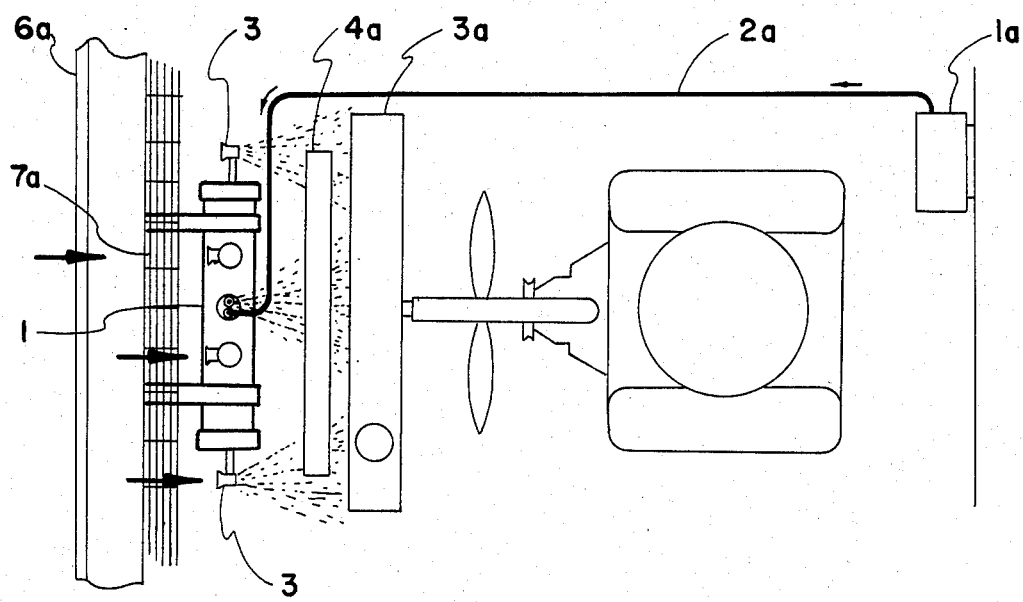
Figure 4:
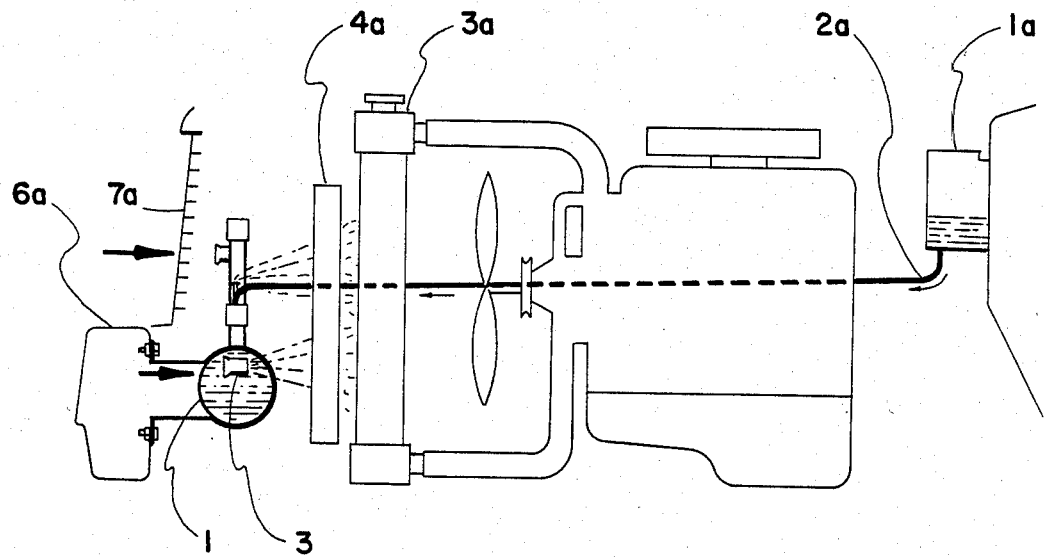
FIG. 4 is a side view diagram of the arrangement contemplated herein when mounted in a vehicle; and, FIG. 5 illustrates a top view of the arrangement depicted in FIG. 4.

Mounted at the front of a vehicle such as an automobile is an elongated tube or cylinder 1. Entering each end of the cylinder 1 is a pipe 2 and at the end of each pipe is a spray unit 3. Exiting from above the cylinder 1 are additional pipes 4 with outer air inlet units 4'. Pipes 2 are held in place by end caps 6 which seal off the cylinder 1. The entire space within the cylinder 1 acts as a reservoir. A safety outlet 7 is provided at the top of cylinder 1 to permit excess air pressure to escape. Water from the vehicle air conditioning system is fed to an inlet 8 both safety outlet 7 and inlet 8 are held to the reservoir cylinder 1 by a cap 5 and a connecting jacket 9. The safety outlet 7 and water inlet 8 pass through the cap 5 along the connecting jacket 9 into the reservoir cylinder 1. The cylinder 1 is held to the bottom of a vehicle by means of a mounting bracket 10 depicted in FIG. 3.

Water from the vehicle air conditioning system enters the cylinder through a rubber tube 2a which connects the outlet from the vehicle air conditioning system 1a to the condensate inlet 8. This rubber tube 2a passes the vehicle radiator 3a as well as the air conditioning unit condenser core 4a. At the same time, outside air enters the reservoir cylinder 1 through air inlets 4' which are preferably flared. Pressure from the outside air entering the reservoir cylinder 1 forces the condensate in the reservoir up through the end pipes 2 and out the spray units 3. In other words, the internal air pressure is created by the air flow being forced into the flared air inlet units 4', down additional pipes 4 into the cylinder 1. This air pressure forces the condensate in the cylinder 1 into pipes 2 out of the spray units 3. The air flow created by the forward movement of the vehicle and the vehicle's cooling fan carries the condensate into the vehicle's air conditioning condenser core and radiator. The safety outlet 7 and jacket 9 blocks air pressure from escape prematurely.

In other words, once the condensate spray is forced out of the cylinder, air flows from the forward movement of the vehicle and air flow created by the vehicle's radiator cooling fan directs the condensate spray into the vehicle's air conditioning condenser core. The condensate then assists the condenser core in removing heat from the circulating freon, sending a much cooler freon back to the vehicle's air conditioning compressor. A small amount of condensate spray passes through the condenser core and aids the vehicle's radiator in removing heat from hot water circulating through the radiator.

The benefits derived from the foregoing arrangement are:

1. The vehicle's interior is cooled faster, which allows the vehicle's air conditioning compressor to cycle off faster and more often.

2. The head pressure on the compressor is reduced.

3. The horse power required to operate the vehicle's air conditioning system is reduced.

4. The vehicle's cooling system is aided by the condensate cooling air as it passes through the condenser core and the small amount of condensate that actually reaches the vehicle's radiator.

5. Because of the foregoing benefits, a moderate increase in vehicle gas mileage is attainable.

The cylinder is preferably mounted on the vehicle bumper 6a using the mounting bracket shown in FIG. 3. However, some vehicles will require special brackets due to their construction. It is important for the air inlet units 4' to be so placed as to receive air flow through the grill 7a.

It is to be observed therefore that the present invention contemplates an arrangement for enhancing the performance of a vehicle air conditioning unit, which is designed to be attached to the front of the vehicle at a level which is below the level of the vehicle air conditioning unit evaporator drain. The arrangement includes an elongated cylinder 1 which is sized so that its length is less than the width of a normal vehicle. This cylinder has a defined top portion or upper portion with a water condensate inlet 8 in said upper portion which is adapted and designed to be connected to the evaporator drain. Air inlet units 4, 4', with an inlet flared mouth are disposed so as to receive incoming air, as the vehicle moves in the forward direction; these inlet units extend out from the cylinder upper portion. Spray units 3 extend out from the cylinder with spray heads facing the vehicle air conditioning condenser 4a so that condensate from the vehicle air conditioning condenser evaporator drain enters the cylinder through inlet 8 while outside air enters the cylinder through the inlet units 4, 4' so that the air forces the condensate in the cylinder out through the spray units 3 onto the air conditioning condenser so as to cool the freon therein.

What is claimed is:

1. An arrangement for enhancing the performance of a vehicle air conditioning unit, said air conditioning unit including a condensor and an evaporator, said evaporator having a drain connected thereto for draining condensate collected therefrom, said arrangement comprising in combination:

(a) an elongated cylinder (1) having a defined upper portion with a water condensate inlet (8) in said upper portion, said inlet (8) including a tube connected to said evaporator drain; brackets (10) connecting the cylinder (1) to the front of the vehicle at a level below the level of the evaporator drain, the elongated cylinder (1) being of a lesser length than the width of the vehicle;

(b) air inlet units (4, 4') including pipes with an inlet flared mouth disposed to receive incoming air as the vehicle moves in the forward direction, said air inlet units extending out from said cylinder upper portion; and, (c) spray units (3) extending out from said cylinder with spray heads facing the condenser whereby, condensate from the vehicle air conditioning unit evaporator drain enters the cylinder through said inlet (8) while outside air enters said cylinder through said inlet units so that the air forces the condensate in the cylinder out of the spray units (3) onto the air conditioning condenser so as to cool the freon therein.

* * * * *